US010956594B2

(12) United States Patent
VanLoo et al.

(10) Patent No.: US 10,956,594 B2
(45) Date of Patent: Mar. 23, 2021

(54) USER INTERFACE FOR INTERACTING WITH MULTIPLE DATABASES

(71) Applicant: IDENTITY THEFT GUARD SOLUTIONS, INC., Portland, OR (US)

(72) Inventors: Brent VanLoo, Forest Grove, OR (US); Christopher Semke, Portland, OR (US); Christopher Ryan Johnson, Sherwood, OR (US); Chase Dimick, Beaverton, OR (US)

(73) Assignee: IDENTITY THEFT GUARD SOLUTIONS, INC., Portland, OR (US)

( * ) Notice: Subject to any disclaimer, the term of this patent is extended or adjusted under 35 U.S.C. 154(b) by 270 days.

(21) Appl. No.: 15/986,284

(22) Filed: May 22, 2018

(65) Prior Publication Data

US 2019/0362086 A1 Nov. 28, 2019

(51) Int. Cl.
*G06F 21/62* (2013.01)
*H04L 29/06* (2006.01)
(Continued)

(52) U.S. Cl.
CPC .......... *G06F 21/6218* (2013.01); *G06F 9/547* (2013.01); *H04L 63/083* (2013.01); *H04L 63/102* (2013.01); *H04L 41/0273* (2013.01)

(58) Field of Classification Search
CPC ....... H04L 63/08; H04L 63/10; H04L 63/083; H04L 9/3271; H04L 63/102; H04L 63/00;
(Continued)

(56) References Cited

U.S. PATENT DOCUMENTS 7,774,270 B1 * 8/2010 MacCloskey ........ G06Q 40/025 705/38
8,606,666 B1 * 12/2013 Courbage .............. G06Q 40/04 705/34

(Continued)

OTHER PUBLICATIONS

Merkle, Philipp, and Christian Stier. "Modelling database lock-contention in architecture-level performance simulation." Proceedings of the 5th ACM/SPEC international conference on Performance engineering. 2014. (Year: 2014).*

(Continued)

*Primary Examiner* — Robert B Leung
*Assistant Examiner* — Sameera Wickramasuriya
(74) *Attorney, Agent, or Firm* — Schwegman Lundberg & Woessner, P.A.

(57) ABSTRACT

A user interface for interacting with multiple databases allows a user to lock or unlock access to their data in multiple databases simultaneously, each database being controlled by a different entity. A user interface server communicates with servers of the multiple databases to request that the consumer's data be locked or unlocked. The user interface server may also report to the consumer the lock status of the consumer's data in each of the multiple databases. To authenticate the user, the user interface for interacting with multiple databases may provide one or more authentication prompts prior to allowing the user to lock or unlock access to their data. The authentication prompts may be provided by one or more of the multiple entities.

19 Claims, 12 Drawing Sheets

(51) Int. Cl.
*G06F 9/54* (2006.01)
*H04L 12/24* (2006.01)

(58) Field of Classification Search
CPC . H04L 63/0815; H04L 41/0273; G06F 21/31; G06F 21/36; G06F 21/60; G06F 21/6245; G06F 21/62; G06F 21/41; G06F 2221/2147; G06F 21/6218; G06F 9/547
See application file for complete search history.

(56) References Cited

U.S. PATENT DOCUMENTS

| | | | | |
|---|---|---|---|---|
| 9,106,691 | B1 * | 8/2015 | Burger | H04L 63/1425 |
| 9,489,694 | B2 * | 11/2016 | Haller | G06Q 40/00 |
| 9,830,646 | B1 * | 11/2017 | Wasser | G06F 3/01 |
| 9,853,959 | B1 * | 12/2017 | Kapczynski | G06F 21/62 |
| 10,061,936 | B1 * | 8/2018 | Burger | H04L 63/1408 |
| 10,505,930 | B2 * | 12/2019 | Ting | G06F 21/32 |
| 2006/0064560 | A1 * | 3/2006 | Mizuno | G06F 21/805 711/164 |
| 2007/0083463 | A1 * | 4/2007 | Kraft | G06Q 40/025 705/38 |
| 2007/0266439 | A1 * | 11/2007 | Kraft | H04L 63/083 726/26 |
| 2008/0208726 | A1 * | 8/2008 | Tsantes | G06Q 40/02 705/35 |
| 2010/0250411 | A1 * | 9/2010 | Ogrodski | G06Q 10/10 705/30 |
| 2013/0145426 | A1 * | 6/2013 | Wright | H04L 63/10 726/3 |
| 2014/0089346 | A1 * | 3/2014 | Li | G06F 21/6218 707/781 |
| 2016/0155196 | A1 * | 6/2016 | Haller | G06Q 40/00 705/38 |
| 2019/0258818 | A1 * | 8/2019 | Yu | G06F 21/6245 |

OTHER PUBLICATIONS

Nurse, Spencer. “The Equifax Data Breach.” The New York Times (2017). (Year: 2017).*

* cited by examiner

700

410 — ADAM SMITH

720 —
AT WHICH OF THE FOLLOWING ADDRESSES DID YOU LIVE?
- ◉ 1428 ELM STREET
- ○ 707 MERIDIAN AVENUE
- ○ 18 BROOKS DRIVE
- ○ NONE OF THESE

730 — SUBMIT

800

810

| | USER TABLE | | |
|---|---|---|---|
| 820 | USER ID | NAME | SSN |
| 830A | 1234 | ADAM SMITH | 111-11-1111 |
| 830B | 2345 | JOHN JAY | 222-22-2222 |
| 830C | 3456 | JAMES WILSON | 333-33-3333 |

840

| | STATUS TABLE | | |
|---|---|---|---|
| 850 | USER ID | ENTITY ID | STATUS |
| 860A | 1234 | 0001 | LOCKED |
| 860B | 1234 | 0002 | UNLOCKED |
| 860C | 1234 | 0003 | UNLOCKED |

*FIG. 8*

USER INTERFACE FOR INTERACTING WITH MULTIPLE DATABASES

TECHNICAL FIELD

The subject matter disclosed herein generally relates to network communications and user interfaces. Specifically, in some example embodiments, the present disclosure addresses systems and methods for providing a user interface for interacting with multiple databases.

BRIEF DESCRIPTION OF THE DRAWINGS

Some embodiments are illustrated by way of example and not limitation in the figures of the accompanying drawings.

FIG. 8 is a block diagram illustrating a database schema suitable for supporting a user interface for interacting with multiple databases, according to some example embodiments.

DETAILED DESCRIPTION

Example methods and systems are directed to a user interface for interacting with multiple databases. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

Databases of different entities have independent locking features to control access to a user's data. A user interface for interacting with multiple databases allows the user to lock or unlock access to their data with multiple entities simultaneously. A user interface (UI) server communicates with servers corresponding to each of the different entities request that the data access be locked or unlocked. The UI server may also report to the consumer the data access status of the for the user's data with each of the different entities.

To authenticate the user, the user interface for interacting with multiple databases may provide one or more authentication prompts prior to allowing the user to lock or unlock their data. The authentication prompts may be provided by one or more of the multiple entities.

Users wishing to lock, unlock, freeze, or unfreeze credit with credit reporting agencies using existing interfaces contact each credit reporting agency to request the change in credit status. Locking and freezing credit both result in a credit reporting agency refusing to provide credit data to the third-parties. The processes for locking and freezing credit may be different in terms of time to process a modification request, fees charged, frequency that changing the locked or frozen status is permitted, or in other ways. The user interface for interacting with multiple databases is an improvement over existing interfaces, which require the consumer to authenticate, check lock status, and request the locking or unlocking of credit with each credit reporting agency individually. The existing process is comparatively error-prone, since a consumer may easily overlook an agency, and time consuming, since the consumer must perform each step multiple times. Furthermore, by reducing the time spent by the consumer in locking or unlocking access to data with multiple databases, processor cycles are saved on the consumer's device and, as a result, power consumption by the device is reduced. For battery-powered devices, a reduction in power consumption also results in an extension of battery life.

Figure 1:
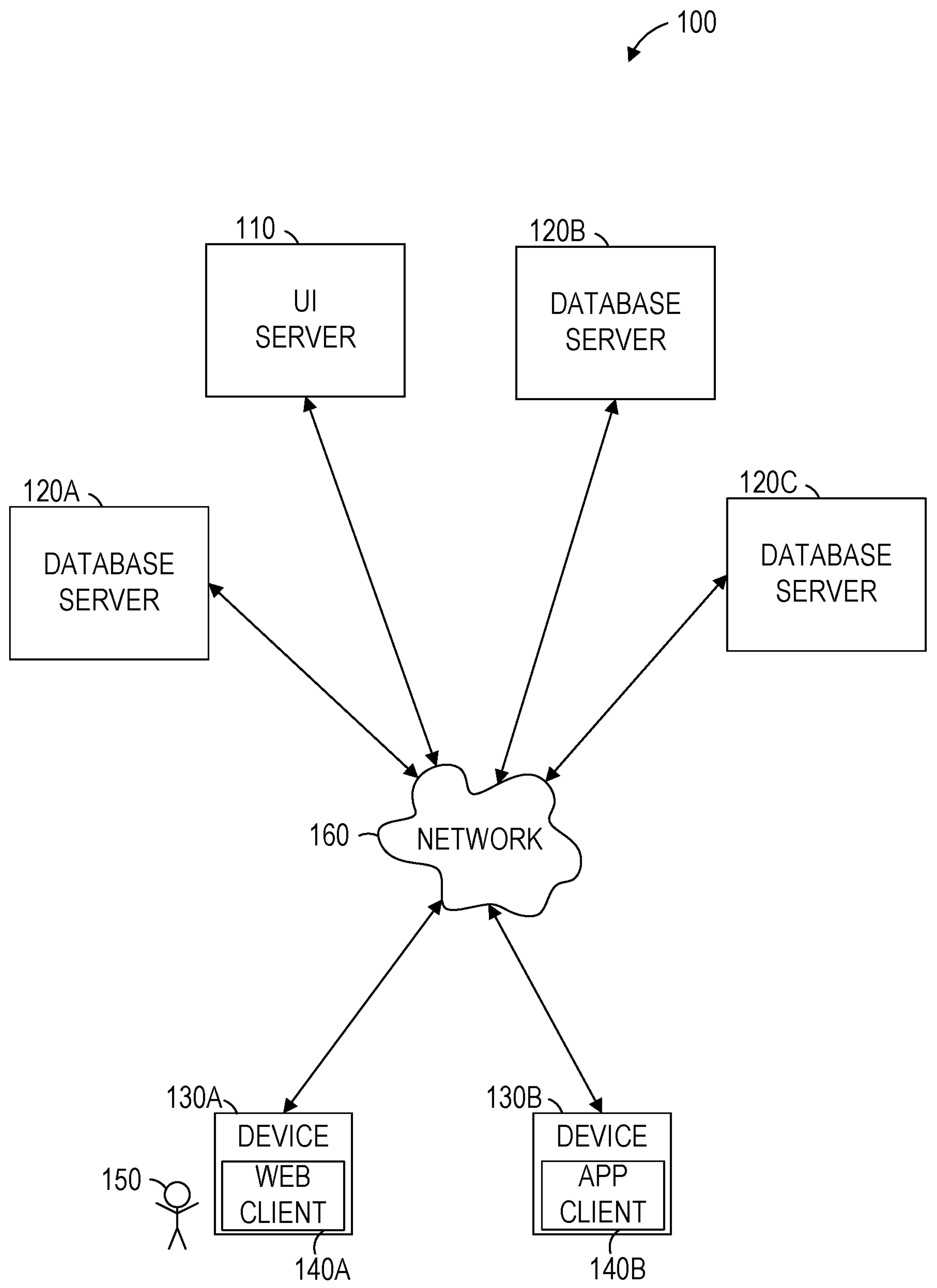
FIG. 1 is a network diagram illustrating a network environment suitable for a user interface for interacting with multiple databases, according to some example embodiments.

FIG. 1 is a network diagram illustrating a network environment 100 suitable for a user interface for interacting with multiple databases (e.g., a user interface for interacting with multiple databases), according to some example embodiments. The network environment 100 includes a UI server 110, database servers 120A, 120B, and 120C, and devices 130A and 130B, all communicatively coupled to each other via a network 160. The database servers 120A-120C may be collectively referred to as "database servers 120," or generically referred to as a "database server 120." The devices 130A and 130B may be collectively referred to as "devices 130," or generically referred to as a "device 130." The UI server 110 is a network-based system. The devices 130 may interact with the UI server 110 using a web client 140A or an app client 140B. The UI server 110 and the devices 130 may each be implemented in a computer system, in whole or in part, as described below with respect to FIGS. 11-12.

The UI server 110 provides a user interface for interacting with multiple databases to other machines (e.g., the devices 130) via the network 160. The user interface for interacting with multiple databases may provide a way for users to lock and unlock accessibility of data with multiple entities by communication with the database servers 120. For example, the database servers 120 may be credit reporting agency servers and the user may lock and unlock accessibility of credit data with each of multiple credit reporting agencies.

Also shown in FIG. 1 is a user 150. The user 150 may be a human user (e.g., a human being), a machine user (e.g., a computer configured by a software program to interact with the devices 130 and the UI server 110), or any suitable combination thereof (e.g., a human assisted by a machine or a machine supervised by a human). The user 150 is not part of the network environment 100, but is associated with the devices 130 and may be a user of the devices 130 (e.g., an owner of the devices 130A and 130B). For example, the device 130 may be a desktop computer, a vehicle computer, a tablet computer, a navigational device, a portable media device, or a smart phone belonging to the user 150.

In some example embodiments, the UI server 110 receives a selection from a device 130 to lock access to data of multiple entities, each of the multiple entities (e.g., multiple credit reporting agencies) providing one of the database servers 120. The UI server 110 generates, for each of the database servers 120, a request to lock access to data (e.g., to lock credit) and transmits the request to the database server. Each database server 120 responds to the request, indicating whether the request was successful or not. The UI server 110 may update the user interface for interacting with multiple databases provided on the device 130 to show the updated data access status for each entity.

Any of the machines, databases, or devices shown in FIG. 1 may be implemented in a general-purpose computer modified (e.g., configured or programmed) by software to be a special-purpose computer to perform the functions described herein for that machine, database, or device. For example, a computer system able to implement any one or more of the methodologies described herein is discussed below with respect to FIGS. 11-12. As used herein, a "database" is a data storage resource and may store data structured as a text file, a table, a spreadsheet, a relational database (e.g., an object-relational database), a triple store, a hierarchical data store, or any suitable combination thereof. Moreover, any two or more of the machines, databases, or devices illustrated in FIG. 1 may be combined into a single machine, database, or device, and the functions described herein for any single machine, database, or device may be subdivided among multiple machines, databases, or devices.

The network 160 may be any network that enables communication between or among machines, databases, and devices (e.g., the UI server 110 and the devices 130). Accordingly, the network 160 may be a wired network, a wireless network (e.g., a mobile or cellular network), or any suitable combination thereof. The network 160 may include one or more portions that constitute a private network, a public network (e.g., the Internet), or any suitable combination thereof.

Figure 2:
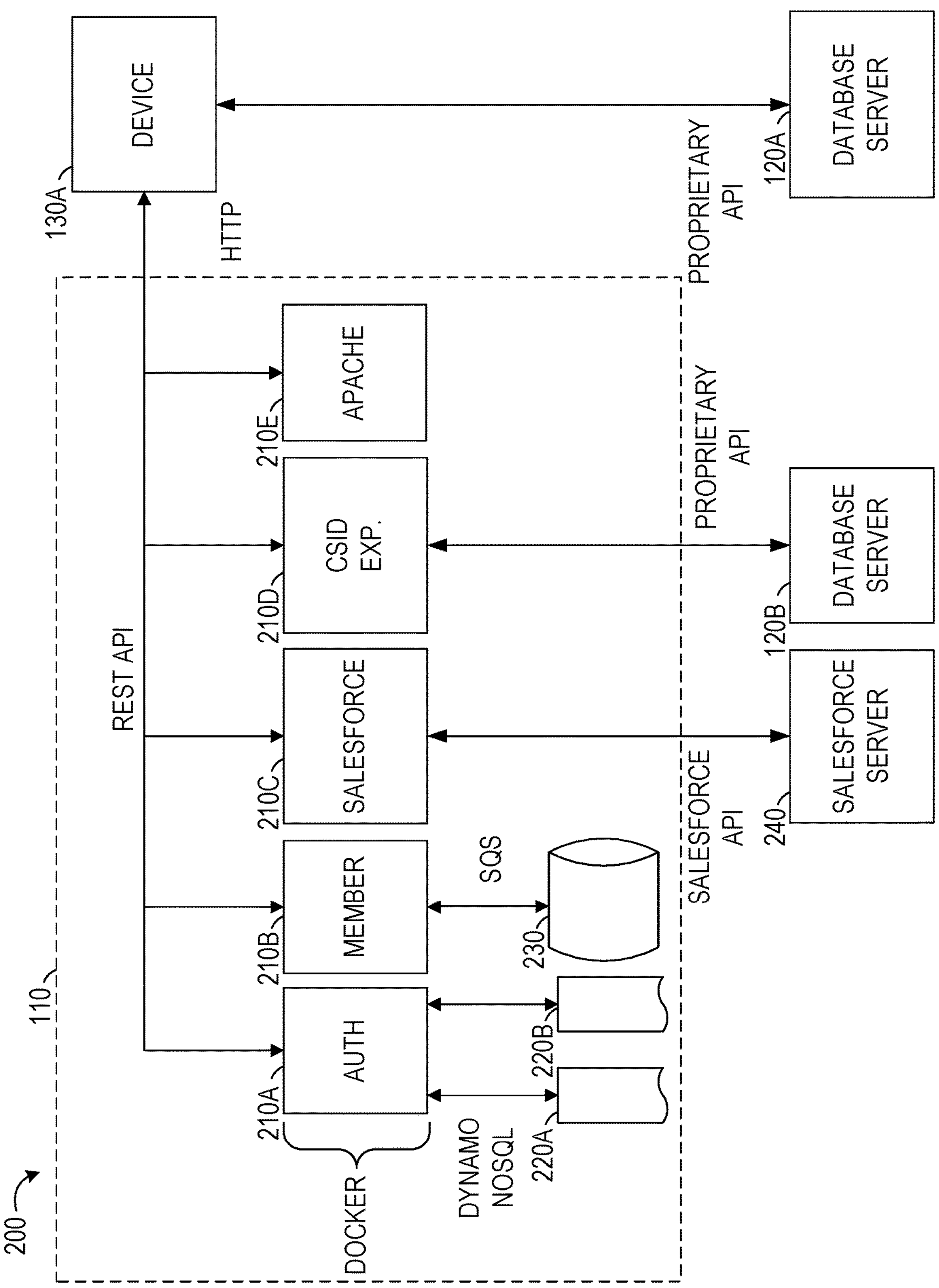
FIG. 2 is an architectural diagram illustrating components of a user interface server in communication with other systems, according to some example embodiments.

FIG. 2 is an architectural diagram 200 illustrating components of a UI server 110 suitable for providing a user interface for interacting with multiple databases, according to some example embodiments. The UI server 110 includes an Apache Docker container 210E that serves a web site, via a hypertext transfer protocol (HTTP) connection, to the device 130A. The web browser of the device 130A is in communication, via a representational state transfer (REST) application programming interface (API), with an authorization Docker container 210A, a member Docker container 210B, a SalesForce™ Docker container 210C, and a CSID Experian™ Docker container 210D. The member Docker container 210B accesses a database 230 using the Simple Queue Service (SQS). The SalesForce™ Docker container 210C accesses a SalesForce™ server 240 using the SalesForce™ API. The CSID Experian™ Docker container 210D accesses the database server 120B using a proprietary API. The database 120A is accessed by the device 130A using another proprietary API.

Structured Query Language (SQL) is used to access standard relational databases. NoSQL is used to refer to databases other than standard relational databases. Dynamo NoSQL is a particular type of NoSQL based on key-value pairs. The authorization Docker container 210A uses Dynamo NoSQL to access data files 220A and 220B. For example, the data files 220A and 220B may store usernames, passwords, authentication questions, user profiles, or any suitable combination thereof. Accordingly, a user may enter identifying information into a web page served by the Apache Docker container 210E, and the user's web browser may send the entered information to the authorization Docker container 210A (e.g., using Angular 5 code embedded in the web page and running on the user's web browser). The authorization Docker container 210A may verify the information against the data stored in one or both of the data files 220A and 220B to identify or authorize the user.

Docker provides containerization (also referred to as operating-system-level virtualization) of applications, reducing overhead compared to running each application in a separate virtual machine (VM), but providing comparable isolation of the containerized applications (also referred to as containers). The member Docker container 210B accesses the database 230 using SQS to retrieve and store user data. For example, a user's name, social security number, birthdate, address, previous addresses, phone number, bank account numbers, or any suitable combination thereof may be stored in the database 230.

The SalesForce™ server 240 may be accessed by the SalesForce™ Docker container 210C using the SalesForce™ API. The SalesForce™ server 240 provides case management and task management services. For example, a task to periodically reattempt to change credit status with a credit reporting agency may be created using SalesForce™ in the event that an immediate attempt to change the credit status in response to a user request fails.

Some entities provide a proprietary API that may be accessed by the UI server 110 to retrieve and modify credit status. For example, CSID Experian™ provides such an API. Thus, the CSID Experian™ Docker container 210D may access a database server (e.g., the database server 120B) using the CSID Experian™ proprietary API. Other entities provide a proprietary API for access by the user's device (e.g., the device 130A). For example, TransUnion™ provides this type of API. Thus, the device 130A may access a database server (e.g., the database server 120A) using the TransUnion™ proprietary API. The device 130A may be configured, using Angular 5 or another scripting language, by the UI server 110 to communicate with one or more of the entities without using the UI server 110 as an intermediary. In some example embodiments, the device 130A provides updated status information to the UI server 110 (e.g., for storage by the member Docker container 210B in the database 230).

Figure 3:
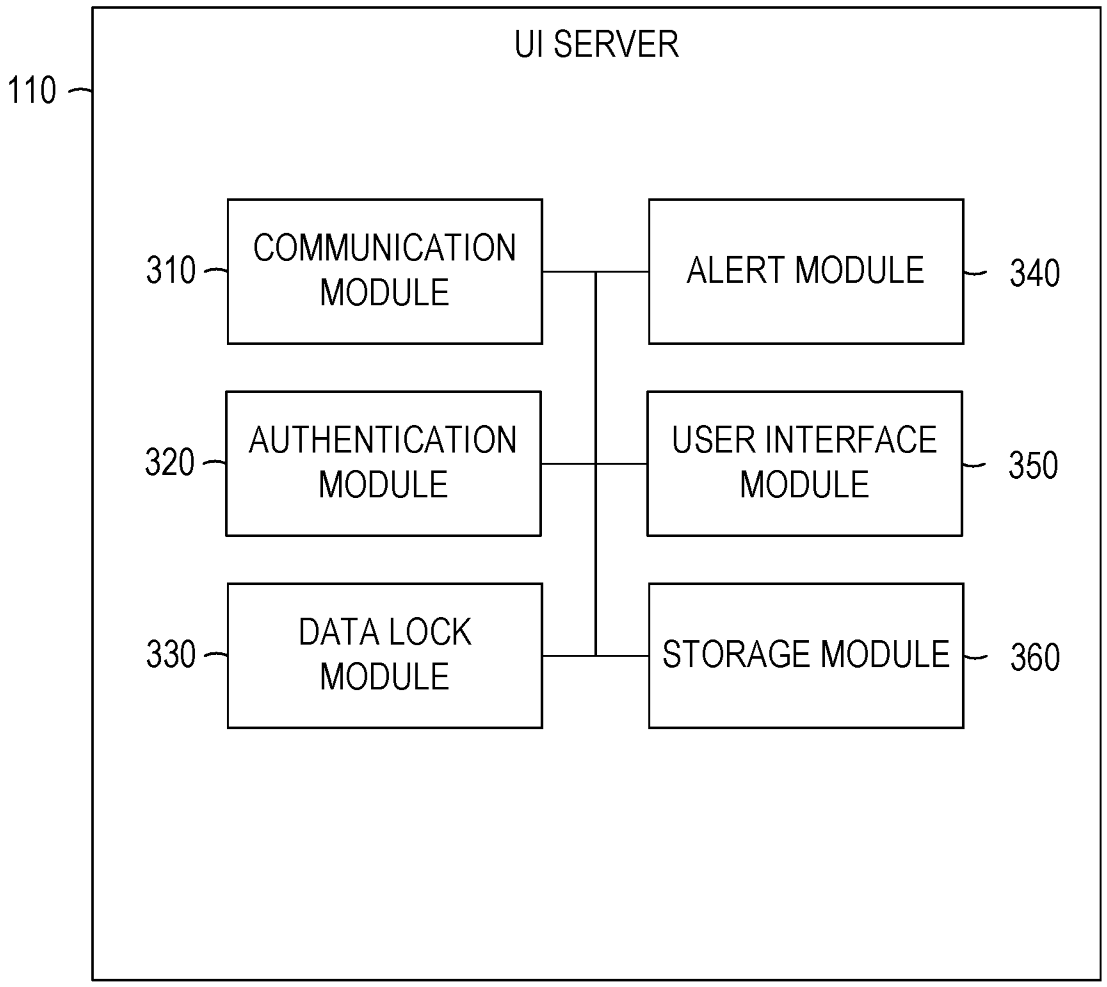
FIG. 3 is a block diagram illustrating components of a user interface server, according to some example embodiments.

FIG. 3 is a block diagram illustrating components of the UI server 110, according to some example embodiments. The UI server 110 is shown as including a communication module 310, an authentication module 320, a data lock module 330, an alert module 340, a user interface module 350, and a storage module 360, all configured to communicate with each other (e.g., via a bus, shared memory, a switch, or APIs). Any one or more of the modules described herein may be implemented using hardware (e.g., a processor of a machine) or a combination of hardware and software. For example, any module described herein may configure a processor to perform the operations described herein for that module. Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices.

The communication module 310 is configured to send and receive data. For example, the communication module 310 may receive, over the network 160, a request for a user interface for interacting with multiple databases from a device 130. The communication module 310 may provide the request to the user interface module 350, transmit a user interface provided by the user interface module 350 to the device 130, and receive user selections of options in the user interface for processing by the authentication module 320 or the data lock module 330, storage by the storage module 360, or any suitable combination thereof.

The authentication module 320 is configured to authenticate a user. For example, a question that only the user is expected to know the answer to may be presented to the user and the user authenticated only if the response is correct. In some example embodiments, multiple such questions are presented and the responses evaluated. The user may be permitted to proceed to view data access status information, lock access to data, unlock access to data, or any suitable combination thereof, only after authentication is successful.

The data lock module 330 is configured to lock or unlock access to the user's data with multiple entities. For example, a request to lock or unlock access to the user's data may be sent, using the communication module 310, to a database server 120, by the credit lock module 330. A response to the request may be received and used to update a user interface provided by the user interface module 350, used to cause an alert to be generated by the alert module 340, stored for later reference by the storage module 360, or any suitable combination thereof.

The alert module 340 is configured to generate alerts. The generated alerts may be provided to users (e.g., to report data access status changes, such as credit status changes, to report data breaches, to report suspected identity theft, or any suitable combination thereof) or to administrators (e.g., to report error conditions in communications with one or more database servers). Each alert may be in the form of e-mail, text message, automated voice message, or another suitable method of notification.

The user interface module 350 is configured to provide a user interface for interacting with multiple databases. The user interface for interacting with multiple databases may include information regarding a user's current credit data access status, provide options to lock or unlock data access with multiple entities, or both. For example, one or more of the user interface for interacting with multiple databases s 400, 500, 600, and 650, described below with respect to FIGS. 4-6, may be presented by the user interface module 350, and selections may be received via an application interface or a web interface. Additionally or alternatively, the user interface module 350 may provide a user interface to authenticate the user, such as a user authentication interface 700, described below with respect to FIG. 7. The storage module 360 is configured to store data regarding users, entities, data access status, or any suitable combination thereof.

Figure 4:
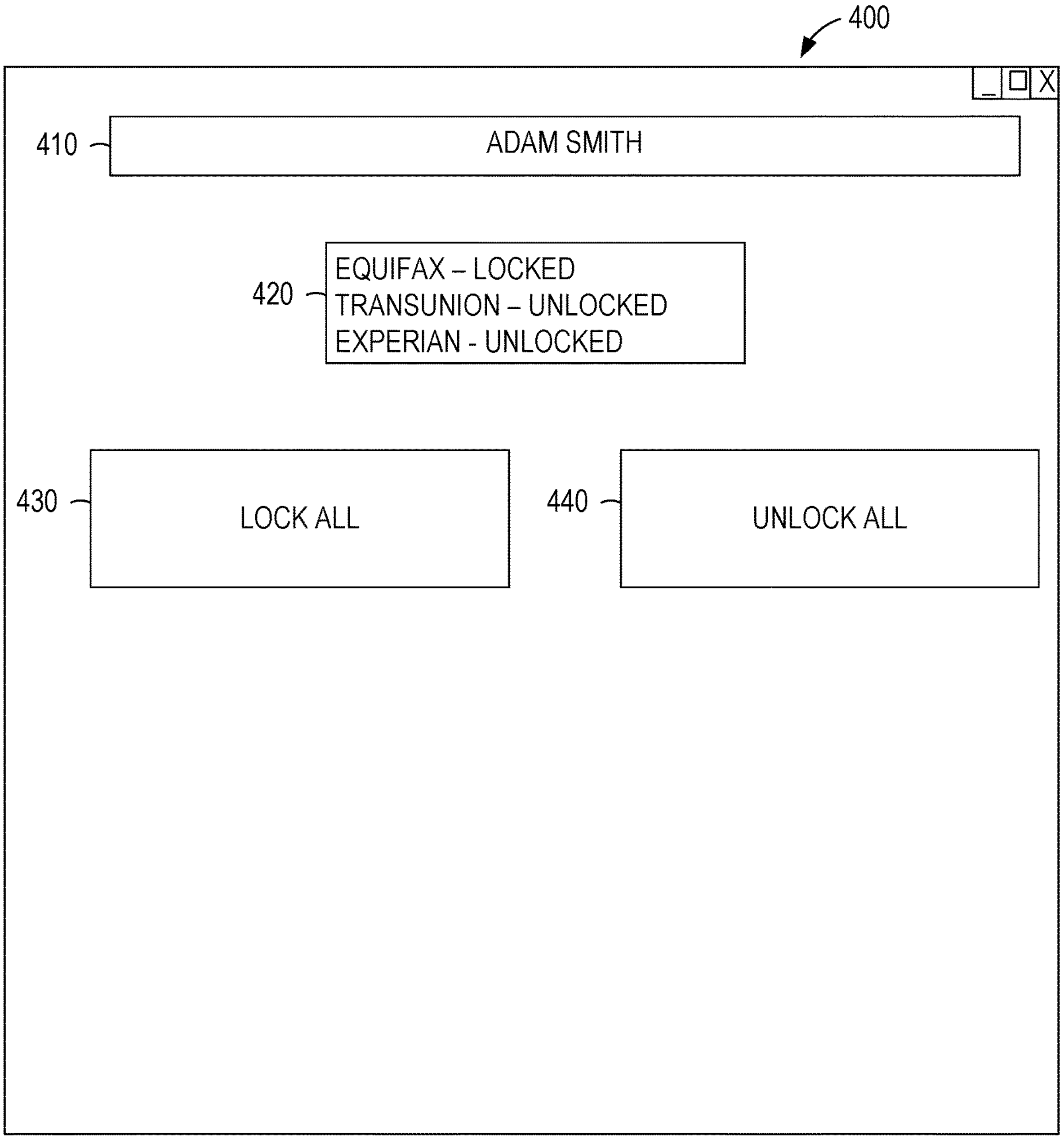
FIG. 4 is a block diagram illustrating a user interface for interacting with multiple databases, according to some example embodiments.

FIG. 4 is a block diagram illustrating a user interface 400 for interacting with multiple databases, according to some example embodiments. As can be seen in FIG. 4, the user interface 400 includes a name 410, a credit status area 420, and buttons 430 and 440.

The user interface 400 may be displayed in response to a user initiating a unified data access lock process (e.g., a unified credit lock process). The name 410 indicates a name of the user. The data access status area 420 shows the current data access status (e.g., locked, unlocked, or frozen) for each of a plurality of entities (e.g., credit reporting agencies). The button 430 is operable to cause the UI server 110 to request each of the entities to lock the user's data. The button 440 is operable to cause the UI server 110 to request each of the entities to unlock the user's credit.

In some example embodiments, the user interface 400 is provided by the UI server 110 dynamically. For example, the UI server 110 may be a web server that communicates with one or more of the database servers 120 to determine the current data access status. A web page served by the UI server 110 may include the data access status information and be rendered by the web client 140A.

In other example embodiments, the user interface 400 is generated by the device 130. For example, the app client 140B may communicate with one or more of the database servers 120 to determine the current data access status. Using the information gathered from the database servers 120, the app client 140B may generate and provide the user interface for interacting with multiple databases 400. The app client 140B may inform the UI server 110 of changes in data access status.

The user interface 400 may also include some information provided by the database servers 120 to the device 130 via the UI server 110 and some information provided by the database servers 120 directly to the device 130. Thus, in these example embodiments, the UI server 110 receives data access status information only from a subset of the database servers 120. The user interface 400 allows the user to monitor and change the data access status with the multiple entities even though the communication paths to the various database servers 120 are distinct (e.g., because the UI server 110 intermediates only a subset of the communications).

Figure 5:
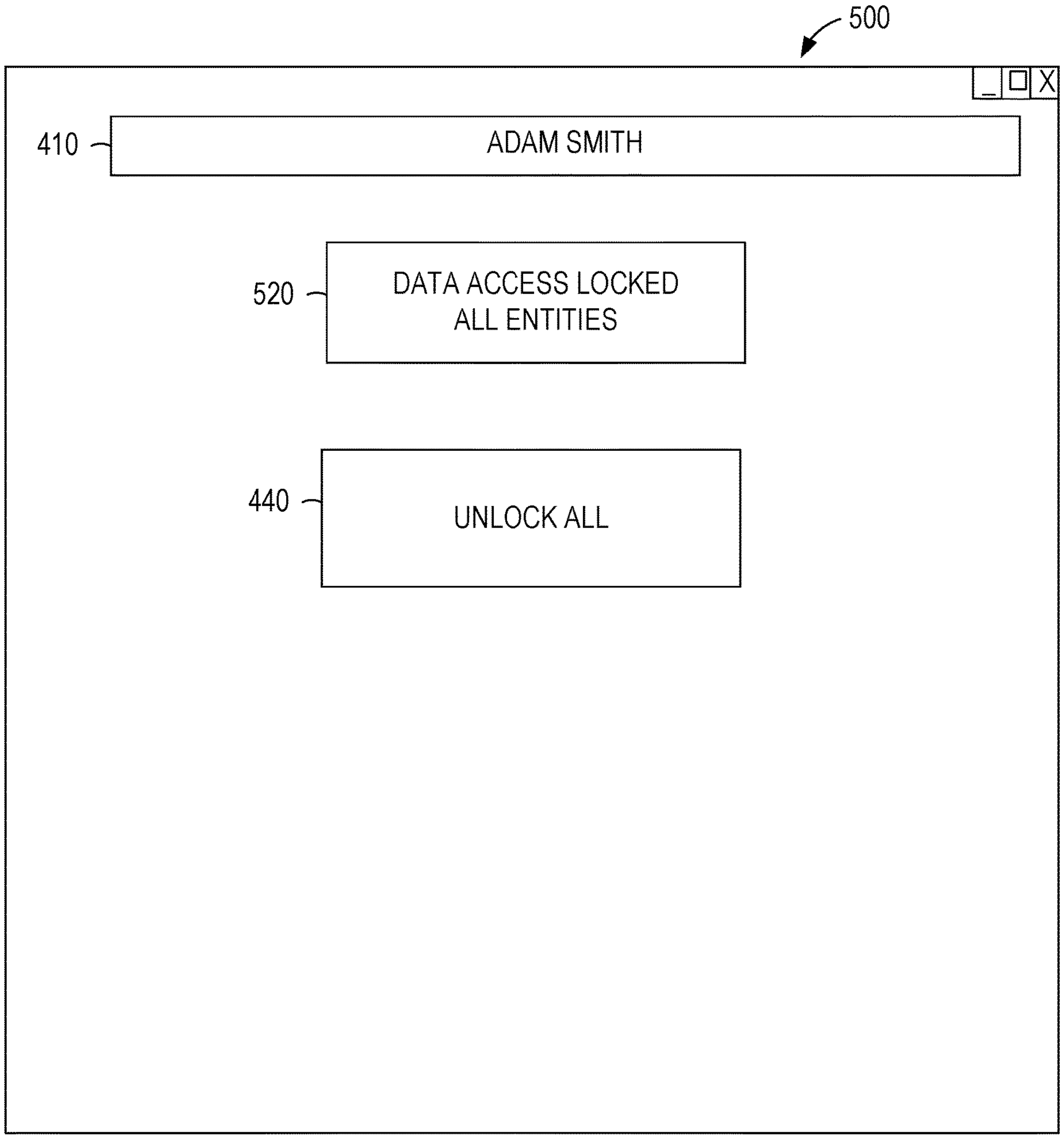
FIG. 5 is a block diagram illustrating a user interface for interacting with multiple databases, according to some example embodiments.

FIG. 5 is a block diagram illustrating a user interface 500 for interacting with multiple databases, according to some example embodiments. As can be seen in FIG. 5, the user interface 500 includes the name 410, a data access status area 520, and the button 440. The user interface 500 may be displayed after the user has opted to lock data access with all entities, showing an updated status in the data access status area 520. Since all entities have locked the user's data (as shown in the data access status area 520), the button 430 is disabled or removed from the user interface 500. As can be seen by comparison of the data access status area 520 and the data access status area 420, when all entities are reporting the same status, the credit status area may report a single status for all entities instead of an individual status for each entity.

Figure 6:
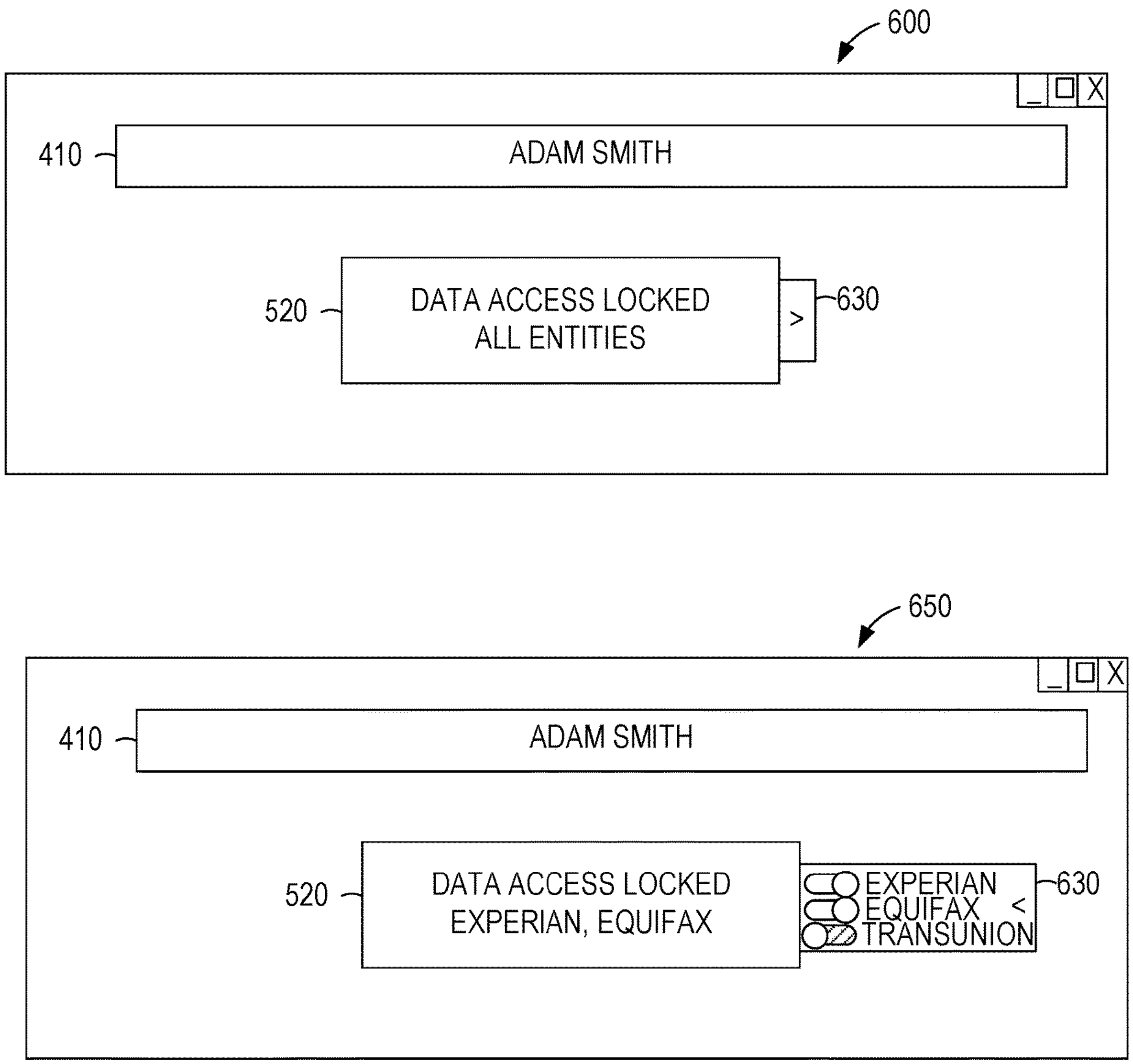
FIG. 6 is a block diagram illustrating user interfaces for interacting with multiple databases, according to some example embodiments.

FIG. 6 is a block diagram illustrating user interfaces 600 and 650 for interacting with multiple databases, according to some example embodiments. As can be seen in FIG. 6, the user interfaces 600 and 650 each include the name 410, the data access status area 520, and a tray 630. A portion of the tray 630 is operable to open and close the tray 630. For example, a user may open or close the tray 630 by clicking or double-clicking on the arrow shown in the tray 630, touching the right edge of the tray 630 on a touch screen, clicking on the tray 630 and dragging the tray 630 to the right or left, or any suitable combination thereof. In the user interface 600, the tray 630 is closed and the credit status area 520 indicates that data access is locked by all entities (e.g., that credit is locked by all credit reporting agencies).

In the user interface 650, the credit status area 520 indicates that credit is locked by two entities, and the tray 630 is open, revealing the data access status with each entity as a slider. For each of the three entities, the corresponding slider is in the left position if data access is not locked and in the right position if data access is locked. Each slider may be operable by the user to request a change in data access status for the corresponding entity. For example, the user may click and drag the slider next to "TransUnion" to initiate a request to the TransUnion™ credit reporting agency to lock credit for the user by locking access to the user's credit data stored in a database controlled by TransUnion™.

Figure 7:
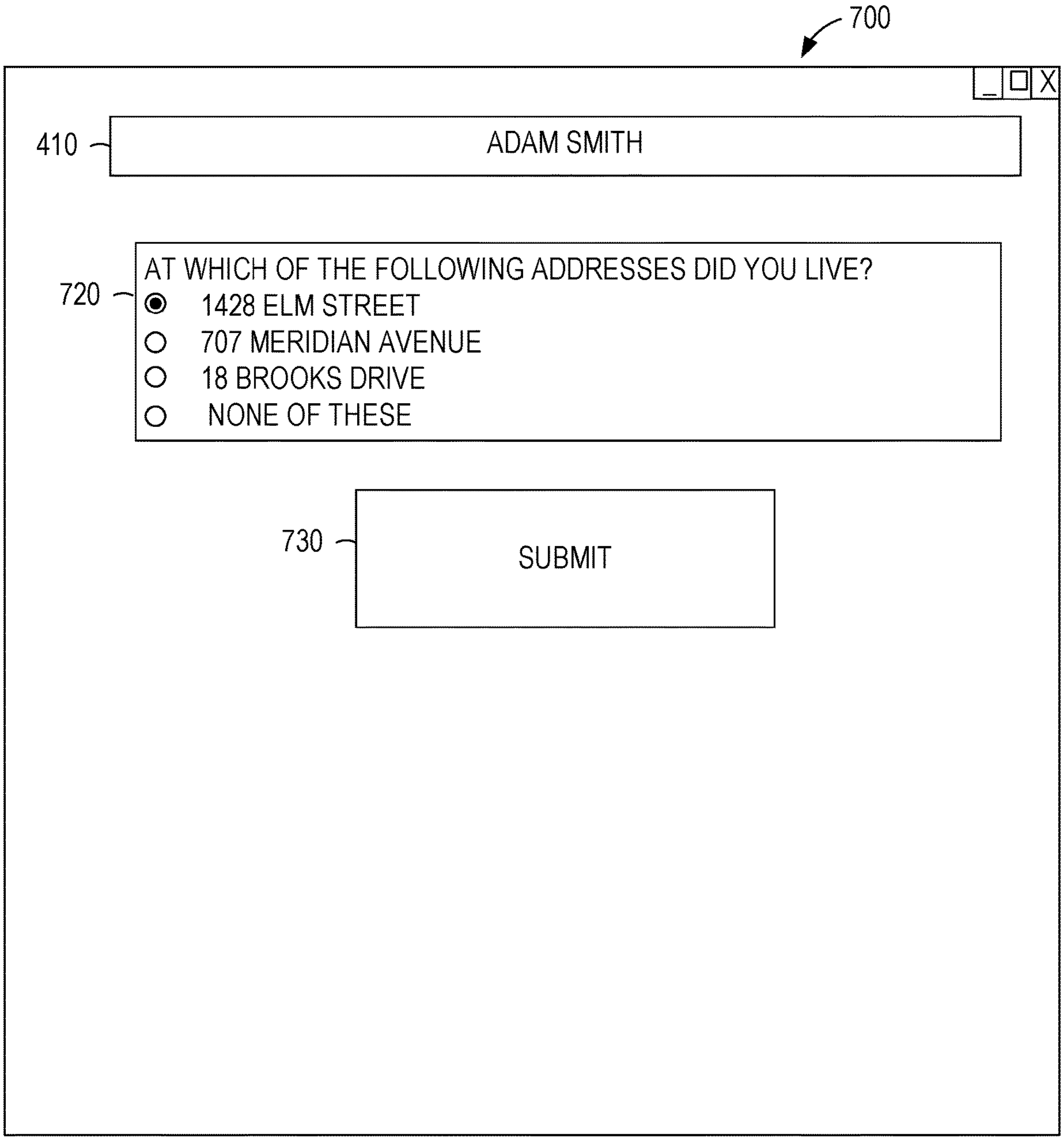
FIG. 7 is a block diagram illustrating a user authentication interface, according to some example embodiments.

FIG. 7 is a block diagram illustrating a user authentication interface 700, according to some example embodiments. As can be seen in FIG. 7, the user authentication interface 700 includes the name 410, an authentication area 720, and a button 730. The user authentication interface 700 may be displayed prior to the display of a user interface for interacting with multiple databases (e.g., the user interface 400, 500, 600, or 650), to authenticate the user before allowing the user to view or modify data access status with multiple entities.

The authentication area 720 displays an authentication prompt to the user. In the example shown, the user selects one of the presented radio buttons to indicate the desired response, such as a current or prior address of the user, then presses the button 730 to submit the response. In other example embodiments, other forms of authentication may be used, such as handwriting analysis, password entry, identifying particular financial transactions, or any suitable combination thereof. Once the user is successfully authenticated, the data access lock process may proceed with presentation of one of the user interfaces 400, 500, 600, or 650.

FIG. 8 is a block diagram illustrating a database schema 800 suitable for supporting a user interface for interacting with multiple databases, according to some example embodiments. The database schema 800 includes a user table 810 and a status table 840. The user table 810 is defined by a table definition 820, including a user identifier field, a name field, and a social security number (SSN) field, and includes rows 830A, 830B, and 830C. The status table 840 is defined by a table definition 850, including a user identifier field, an entity identifier field, and a status field, and includes rows 860A, 860B, and 860C.

Each of the rows 830A-830C stores information for a user. The user identifier field stores a unique identifier for the user. The name field stores a name of the user. The SSN field stores a social security number of the user. In various example embodiments, additional or different fields are stored in the user table 810. For example, an address field, a birthdate field, a phone number field, or any suitable combination thereof may be stored.

Each of the rows 860A-860C stores the data access status of a user with an entity. In the example shown, the rows 860A-860C indicate that the user having the identifier of 1234 (and named "Adam Smith," as determined by reference to the user table 810) has data access locked with one entity and unlocked with two entities.

Figure 9:
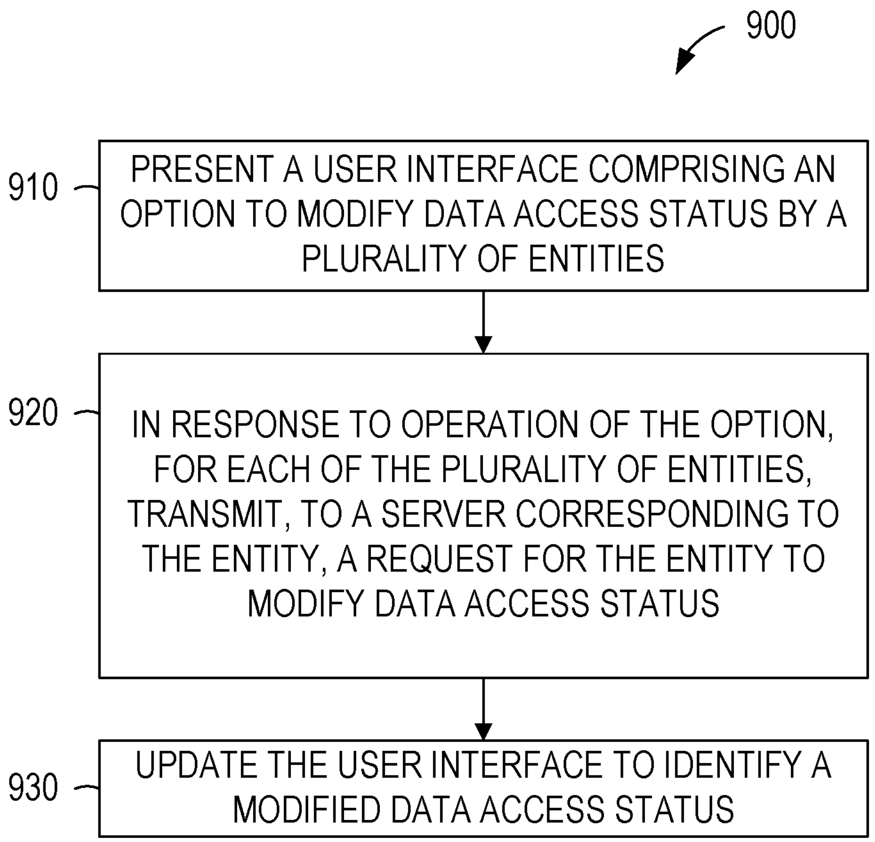
FIG. 9 is a flowchart illustrating operations of a computing device in performing a method of providing a user interface for interacting with multiple databases, according to some example embodiments.

FIG. 9 is a flowchart illustrating operations of a server computer in performing a method 900 of providing a user interface for interacting with multiple databases, according to some example embodiments. By way of example and not limitation, operations in the method 900 are described as being performed by the UI server 110, using modules described above with respect to FIG. 3.

In operation 910, the user interface module 350 causes a user interface to be presented that comprises an option to modify data access status (e.g., to lock access, unlock access, freeze access, unfreeze access, or any suitable combination thereof) by a plurality of entities (e.g., as credit reporting agencies). In some example embodiments, the plurality of entities are at least three entities. The user interface module 350 of the UI server 110 may transmit a web page via the network 160 to the web client 140A of the device 130A for presentation on a display of the device 130A to the user 150. When rendered by the web client 140A, the web page may be presented in the form of the user interface 400, comprising a single lock option in the form of the button 430, operable to lock data access in the databases of the three entities shown in the data access status area 420.

Operation 910 may be performed in response to a request received by the UI server 110, transmitted via an electronic communication network, to lock data access functionality in multiple databases (e.g., in at least three databases), each database corresponding to a different entity. The request may identify a person having data in each of the databases. For example, the person may be identified by user name, name, email address, social security number, by another identifier, or any suitable combination thereof.

In operation 920, in response to the operation of the option, the data lock module 330, for each of the plurality of entities, transmits, to a database server corresponding to the entity, a request for the entity to modify data access status. For example, the data lock module 330 of the UI server 110 may transmit a request to each of the database servers 120A-120C to request that the three entities shown in the data access status area 420 lock data access for the user 150.

The method used to transmit the request to each of the database servers 120A-120C may be selected based on the server. For example, the database server 120A may make use of RESTful APIs with a primary data format based on JavaScript object notation (JSON). A RESTful API is one that uses the representational state transfer (REST) architectural style, and is often implemented using hypertext transfer protocol (HTTP) requests. The database server 120B may use the simple object access protocol (SOAP), in conjunction with remote procedure calls (RPC), REST, and data formatted using extended markup language (XML). The database server 120C may use a blend of RPC and REST with support for data formatted using JSON and XML. Another database server may use the WebServices application programming interface (API). Thus, any combination of data exchange standards such as SOAP, RPC over HTTP, REST, file transfer protocol (FTP), Web Services API, or secure FTP (SFTP) may be used, using any data transmission formats such as XML, JSON, electronic data interchange (EDI), or health level 7 (HL7).

The user interface module 350, in operation 930, updates the user interface to identify a modified data access status (e.g., by communicating, via the electronic communication network, an update message to cause the user interface to confirm that the data access functionality has been locked). For example, one or more of the entity servers 120A-120C may respond to the request to lock data access with an indication that data access has been locked by the corresponding entity. The updated user interface indicates which of the entities have locked data access for the user 150. For example, the user interface 500 shows that all entities have locked the user's data.

If a database server 120 fails to respond, the UI server 110 may store the user's request for retrying later. For example, the row in the status table 840 for the user's data access status with the entity corresponding to the unresponsive server may be updated to indicate both the current status (e.g., unlocked) and the requested status (e.g., locked). A process may periodically (e.g., hourly) query the status table 840 to identify rows in which the current status and the requested status are different. For each identified row, the process may resubmit the change status request for the user, and update the status in the status table 840 once the request is successful.

Figure 10:
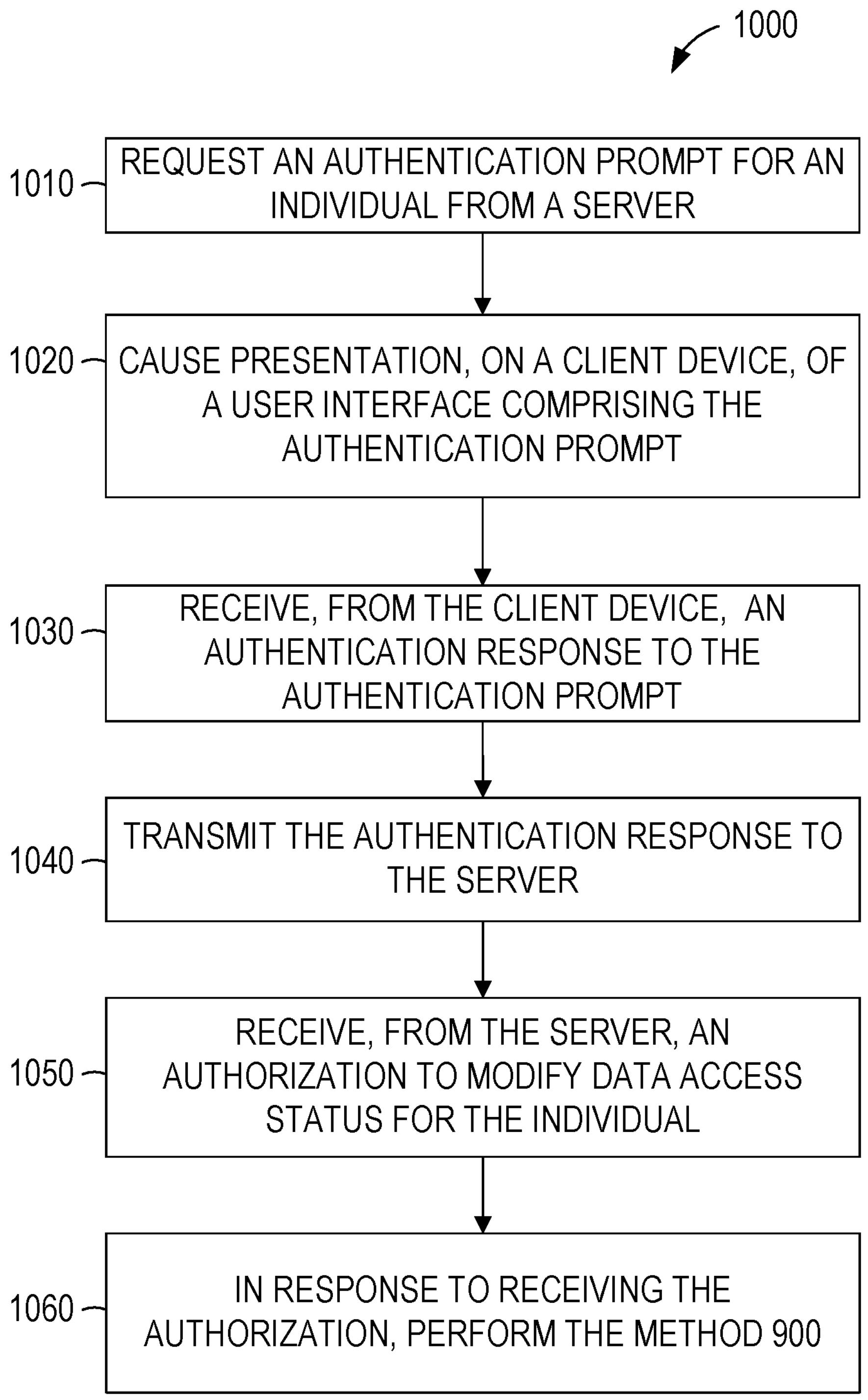
FIG. 10 is a flowchart illustrating operations of a computing device in performing a method of providing a user interface for interacting with multiple databases, according to some example embodiments.

FIG. 10 is a flowchart illustrating operations of a computing device in performing a method 1000 of providing a user interface for interacting with multiple databases, according to some example embodiments. By way of example and not limitation, operations in the method 1000 are described as being performed by the UI server 110, using modules described above with respect to FIG. 3.

In operation 1010, the authentication module 320 requests an authentication prompt for an individual from a server. For example, one of the database servers 120A-120C may be requested to provide the authentication prompt In operation 1020, the authentication module 320 causes a user interface comprising the authentication prompt to be presented on a client device (e.g., the device 130). For example, a programmatic interface of the UI server 110 may provide the user authentication interface 700 for display by the app client 140B on the device 130B.

A response to the authentication prompt is received by the authentication module 320 in operation 1030, and the response is transmitted to the server that provided the prompt in operation 1040.

In some example embodiments, a request is received by the UI server 110, transmitted via an electronic communication network from a client device, to lock data access functionality in multiple databases. The request may identify a person having data in each of the databases. In response to the request, the UI server 110 may authenticate a user of the client device via the electronic communication network, using operations 1010-1040.

After validating the response, the server provides an authorization to modify the data access status (e.g., to lock data access, to unlock data access, to freeze data access, or any suitable combination thereof) for the individual, and, in operation 1050, the authentication module 320 receives the authorization. In some example embodiments, operations 1010-1050 are repeated for additional servers of the database servers 120A-120C. In other example embodiments, the authorization received in operation 1050 from one of the database servers 120A-120C is sufficient to allow modification of data access status from one or more additional database servers 120A-120C.

In operation 1060, in response to receiving the authorization (or authorizations), the method 900 is performed. Thus, by use of the method 1000 in combination with the method 900, a user is authenticated before being permitted to modify data access status (e.g., to lock data access) with multiple entities using a user interface for interacting with multiple databases.

According to various example embodiments, one or more of the methodologies described herein may facilitate efficient modification of data access status (e.g., credit reporting status). Hence, one or more of the methodologies described herein may facilitate locking or unlocking data access with multiple entities (e.g., credit reporting agencies) without requiring the user to connect to multiple servers and respond to multiple prompts.

When these effects are considered in aggregate, one or more of the methodologies described herein may obviate a need for certain efforts or resources that otherwise would be involved in locking or unlocking data access with multiple entities. Efforts expended by a user in modifying credit reporting status may be reduced by one or more of the methodologies described herein. Computing resources used by one or more machines, databases, or devices (e.g., within the network environment 100) may similarly be reduced. Examples of such computing resources include processor cycles, network traffic, memory usage, data storage capacity, power consumption, and cooling capacity.

Modules, Components, and Logic

Certain embodiments are described herein as including logic or a number of components, modules, or mechanisms. Modules may constitute either software modules (e.g., code embodied on a non-transitory machine-readable medium) or hardware-implemented modules. A hardware-implemented module is a tangible unit capable of performing certain operations and may be configured or arranged in a certain manner. In example embodiments, one or more computer systems (e.g., a standalone, client, or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired), or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses that connect the hardware-implemented modules). In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment, or a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application programming interfaces (APIs)).

Electronic Apparatus and System

Example embodiments may be implemented in digital electronic circuitry, in computer hardware, firmware, or software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a standalone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special-purpose logic circuitry, e.g., a field programmable gate array (FPGA) or an application-specific integrated circuit (ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or in a combination of permanently and temporarily configured hardware may be a design choice. Below are set out hardware (e.g., machine) and software architectures that may be deployed, in various example embodiments.

Software Architecture

Figure 11:
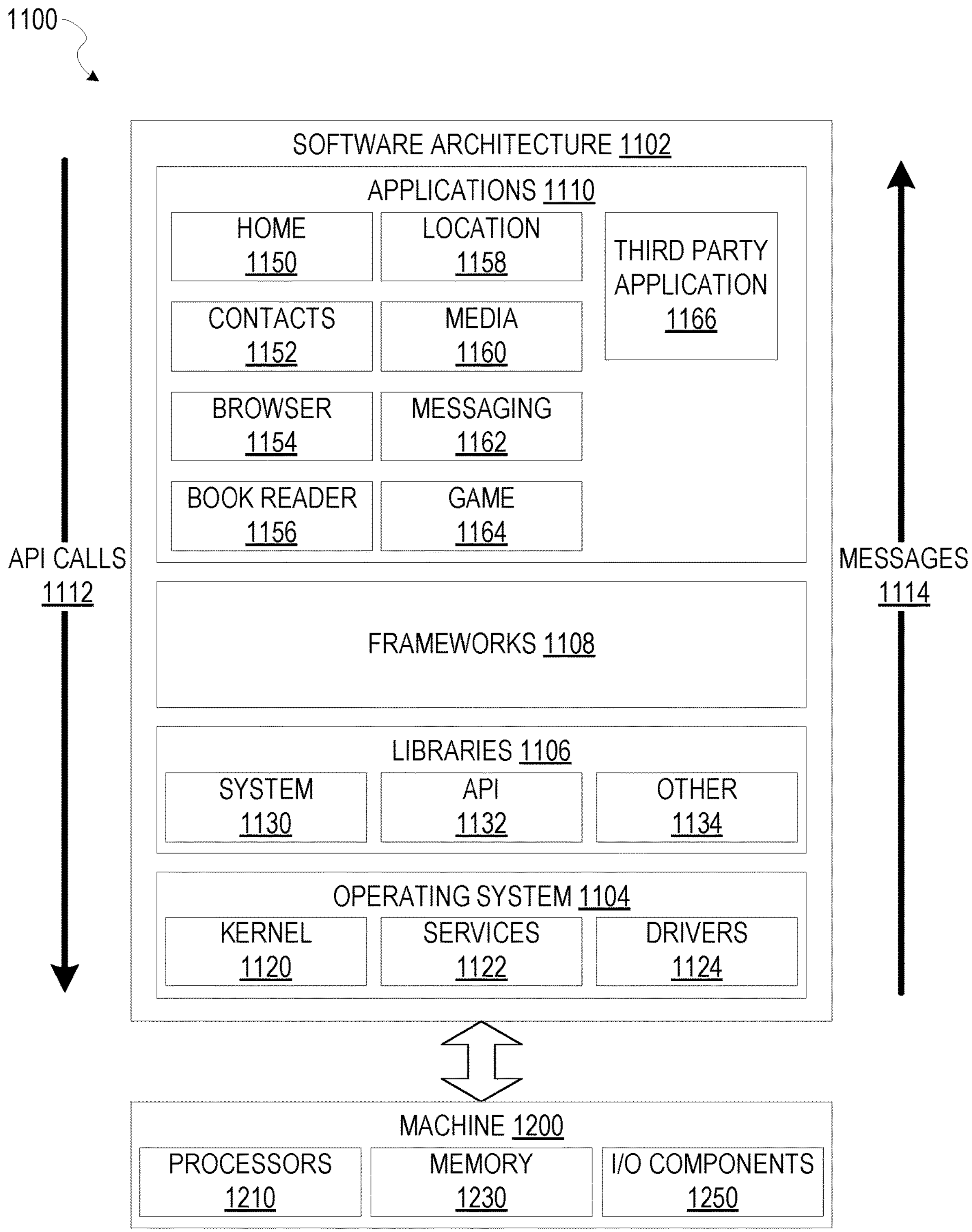
FIG. 11 is a block diagram illustrating an example of a software architecture that may be installed on a machine, according to some example embodiments.

FIG. 11 is a block diagram 1100 illustrating a software architecture 1102, which may be installed on any one or more of the devices described above. FIG. 11 is merely a non-limiting example of a software architecture, and it will be appreciated that many other architectures may be implemented to facilitate the functionality described herein. The software architecture 1102 may be implemented by hardware such as a machine 1200 of FIG. 12 that includes processors 1210, memory 1230, and I/O components 1250. In this example, the software architecture 1102 may be conceptualized as a stack of layers where each layer may provide a particular functionality. For example, the software architecture 1102 includes layers such as an operating system 1104, libraries 1106, frameworks 1108, and applications 1110. Operationally, the applications 1110 invoke application programming interface (API) calls 1112 through the software stack and receive messages 1114 in response to the API calls 1112, according to some implementations.

In various implementations, the operating system 1104 manages hardware resources and provides common services. The operating system 1104 includes, for example, a kernel 1120, services 1122, and drivers 1124. The kernel 1120 acts as an abstraction layer between the hardware and the other software layers in some implementations. For example, the kernel 1120 provides memory management, processor management (e.g., scheduling), component management, networking, and security settings, among other functionality. The services 1122 may provide other common services for the other software layers. The drivers 1124 may be responsible for controlling or interfacing with the underlying hardware. For instance, the drivers 1124 may include display drivers, camera drivers, Bluetooth® drivers, flash memory drivers, serial communication drivers (e.g., Universal Serial Bus (USB) drivers), WiFi® drivers, audio drivers, power management drivers, and so forth.

In some implementations, the libraries 1106 provide a low-level common infrastructure that may be utilized by the applications 1110. The libraries 1106 may include system libraries 1130 (e.g., C standard library) that may provide functions such as memory allocation functions, string manipulation functions, mathematic functions, and the like. In addition, the libraries 1106 may include API libraries 1132 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic context on a display), database libraries (e.g., SQLite to provide various relational database functions), web libraries (e.g., WebKit to provide web browsing functionality), and the like. The libraries 1106 may also include a wide variety of other libraries 1134 to provide many other APIs to the applications 1110.

The frameworks 1108 provide a high-level common infrastructure that may be utilized by the applications 1110, according to some implementations. For example, the frameworks 1108 provide various graphic user interface (GUI) functions, high-level resource management, high-level location services, and so forth. The frameworks 1108 may provide a broad spectrum of other APIs that may be utilized by the applications 1110, some of which may be specific to a particular operating system or platform.

In an example embodiment, the applications 1110 include a home application 1150, a contacts application 1152, a browser application 1154, a book reader application 1156, a location application 1158, a media application 1160, a messaging application 1162, a game application 1164, and a broad assortment of other applications such as a third-party application 1166. According to some embodiments, the applications 1110 are programs that execute functions defined in the programs. Various programming languages may be employed to create one or more of the applications 1110, structured in a variety of manners, such as object-orientated programming languages (e.g., Objective-C, Java, or C++) or procedural programming languages (e.g., C or assembly language). In a specific example, the third-party application 1166 (e.g., an application developed using the Android™ or iOS™ software development kit (SDK) by an entity other than the vendor of the particular platform) may be mobile software running on a mobile operating system such as iOS™, Android™, Windows® Phone, or other mobile operating systems. In this example, the third-party application 1166 may invoke the API calls 1112 provided by the mobile operating system (e.g., the operating system 1104) to facilitate functionality described herein.

Example Machine Architecture and Machine-Readable Medium

Figure 12:
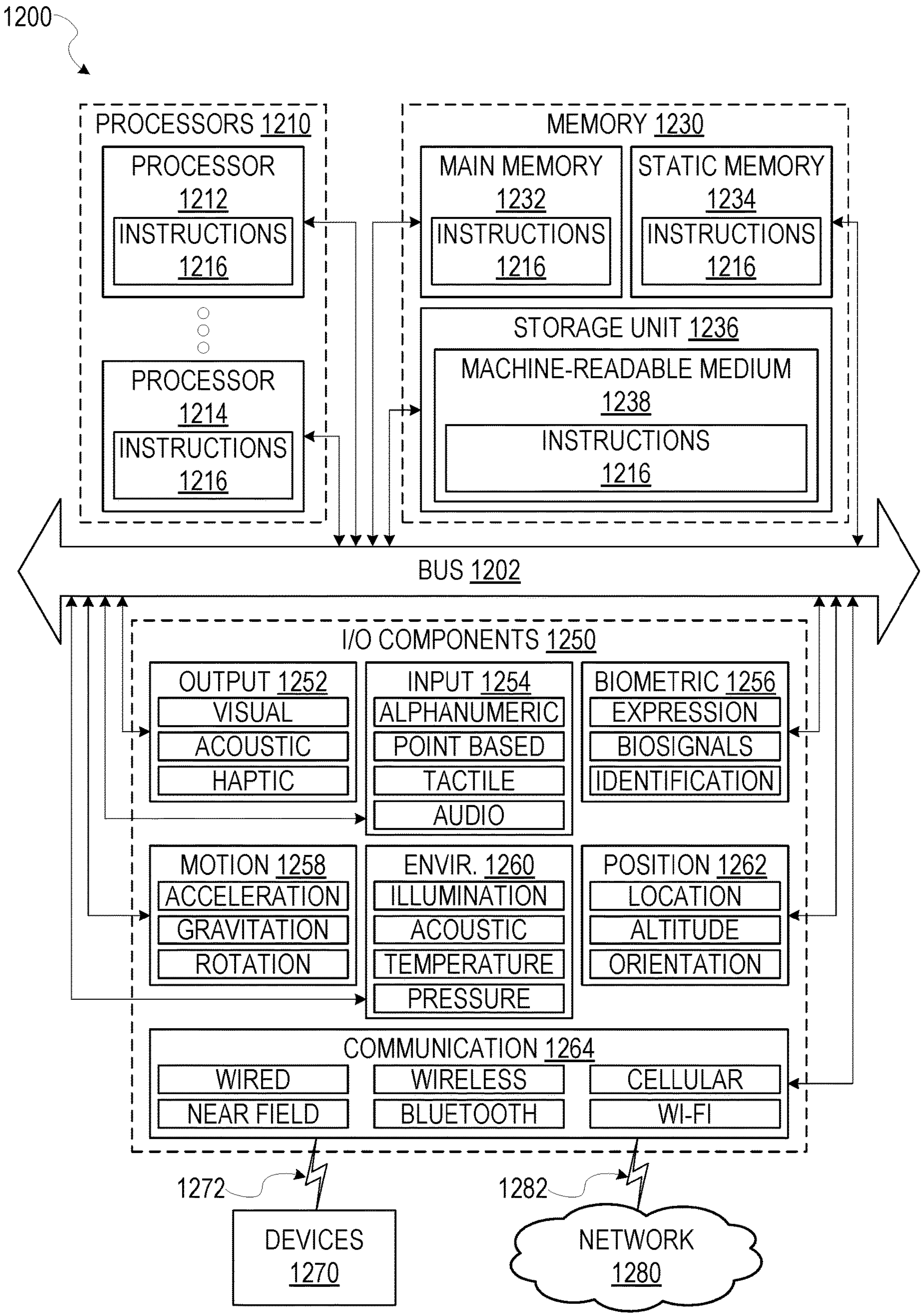
FIG. 12 is a diagrammatic representation of a machine in the form of a computer system within which a set of instructions may be executed for causing the machine to perform any one or more of the methodologies discussed herein, according to an example embodiment.

FIG. 12 is a block diagram illustrating components of a machine 1200, according to some example embodiments, able to read instructions from a machine-readable medium (e.g., a machine-readable storage medium) and perform any one or more of the methodologies discussed herein. Specifically, FIG. 12 shows a diagrammatic representation of the machine 1200 in the example form of a computer system, within which instructions 1216 (e.g., software, a program, an application, an applet, an app, or other executable code) for causing the machine 1200 to perform any one or more of the methodologies discussed herein may be executed. In alternative embodiments, the machine 1200 operates as a standalone device or may be coupled (e.g., networked) to other machines. In a networked deployment, the machine 1200 may operate in the capacity of a server machine or a client machine in a server-client network environment, or as a peer machine in a peer-to-peer (or distributed) network environment. The machine 1200 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1216, sequentially or otherwise, that specify actions to be taken by the machine 1200. Further, while only a single machine 1200 is illustrated, the term "machine" shall also be taken to include a collection of machines 1200 that individually or jointly execute the instructions 1216 to perform any one or more of the methodologies discussed herein.

The machine 1200 may include processors 1210, memory 1230, and I/O components 1250, which may be configured to communicate with each other via a bus 1202. In an example embodiment, the processors 1210 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application-Specific Integrated Circuit (ASIC), a Radio-Frequency Integrated Circuit (RFIC), another processor, or any suitable combination thereof) may include, for example, a processor 1212 and a processor 1214 that may execute the instructions 1216. The term "processor" is intended to include multi-core processors that may comprise two or more independent processors (also referred to as "cores") that may execute instructions contemporaneously. Although FIG. 12 shows multiple processors, the machine 1200 may include a single processor with a single core, a single processor with multiple cores (e.g., a multi-core processor), multiple processors with a single core, multiple processors with multiple cores, or any combination thereof.

The memory 1230 may include a main memory 1232, a static memory 1234, and a storage unit 1236 accessible to the processors 1210 via the bus 1202. The storage unit 1236 may include a machine-readable medium 1238 on which are stored the instructions 1216 embodying any one or more of the methodologies or functions described herein. The instructions 1216 may also reside, completely or at least partially, within the main memory 1232, within the static memory 1234, within at least one of the processors 1210 (e.g., within the processor's cache memory), or any suitable combination thereof, during execution thereof by the machine 1200. Accordingly, in various implementations, the main memory 1232, the static memory 1234, and the processors 1210 are considered machine-readable media 1238.

As used herein, the term "memory" refers to a machine-readable medium 1238 able to store data temporarily or permanently and may be taken to include, but not be limited to, random-access memory (RAM), read-only memory (ROM), buffer memory, flash memory, and cache memory. While the machine-readable medium 1238 is shown in an example embodiment to be a single medium, the term "machine-readable medium" should be taken to include a single medium or multiple media (e.g., a centralized or distributed database, or associated caches and servers) able to store the instructions 1216. The term "machine-readable medium" shall also be taken to include any medium, or combination of multiple media, that is capable of storing instructions (e.g., instructions 1216) for execution by a machine (e.g., machine 1200), such that the instructions, when executed by one or more processors of the machine (e.g., processors 1210), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory (e.g., flash memory), an optical medium, a magnetic medium, other non-volatile memory (e.g., Erasable Programmable Read-Only Memory (EPROM)), or any suitable combination thereof. The term "machine-readable medium" specifically excludes non-statutory signals per se.

The I/O components 1250 include a wide variety of components to receive input, provide output, produce output, transmit information, exchange information, capture measurements, and so on. In general, it will be appreciated that the I/O components 1250 may include many other components that are not shown in FIG. 12. The I/O components 1250 are grouped according to functionality merely for simplifying the following discussion and the grouping is in no way limiting. In various example embodiments, the I/O components 1250 include output components 1252 and input components 1254. The output components 1252 include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor), other signal generators, and so forth. The input components 1254 include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

In some further example embodiments, the I/O components 1250 include biometric components 1256, motion components 1258, environmental components 1260, or position components 1262, among a wide array of other components. For example, the biometric components 1256 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1258 include acceleration sensor components (e.g., accelerometer), gravitation sensor components, rotation sensor components (e.g., gyroscope), and so forth. The environmental components 1260 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., machine olfaction detection sensors, gas detection sensors to detect concentrations of hazardous gases for safety or to measure pollutants in the atmosphere), or other components that may provide indications, measurements, or signals corresponding to a surrounding physical environment. The position components 1262 include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1250 may include communication components 1264 operable to couple the machine 1200 to a network 1280 or devices 1270 via a coupling 1282 and a coupling 1272, respectively. For example, the communication components 1264 include a network interface component or another suitable device to interface with the network 1280. In further examples, the communication components 1264 include wired communication components, wireless communication components, cellular communication components, Near Field Communication (NFC) components, Bluetooth® components (e.g., Bluetooth® Low Energy), WiFi® components, and other communication components to provide communication via other modalities. The devices 1270 may be another machine or any of a wide variety of peripheral devices (e.g., a peripheral device coupled via a USB).

Moreover, in some implementations, the communication components 1264 detect identifiers or include components operable to detect identifiers. For example, the communication components 1264 include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, Uniform Commercial Code Reduced Space Symbology (UCC RSS)-2D bar code, and other optical codes), acoustic detection components (e.g., microphones to identify tagged audio signals), or any suitable combination thereof. In addition, a variety of information can be derived via the communication components 1264, such as location via Internet Protocol (IP) geolocation, location via Wi-Fi® signal triangulation, location via detecting an NFC beacon signal that may indicate a particular location, and so forth.

Transmission Medium

In various example embodiments, one or more portions of the network 1280 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a WiFi® network, another type of network, or a combination of two or more such networks. For example, the network 1280 or a portion of the network 1280 may include a wireless or cellular network and the coupling 1282 may be a Code Division Multiple Access (CDMA) connection, a Global System for Mobile communications (GSM) connection, or another type of cellular or wireless coupling. In this example, the coupling 1282 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

In example embodiments, the instructions 1216 are transmitted or received over the network 1280 using a transmission medium via a network interface device (e.g., a network interface component included in the communication components 1264) and utilizing any one of a number of well-known transfer protocols (e.g., Hypertext Transfer Protocol (HTTP)). Similarly, in other example embodiments, the instructions 1216 are transmitted or received using a transmission medium via the coupling 1272 (e.g., a peer-to-peer coupling) to the devices 1270. The term "transmission medium" shall be taken to include any intangible medium that is capable of storing, encoding, or carrying the instructions 1216 for execution by the machine 1200, and includes digital or analog communications signals or other intangible media to facilitate communication of such software.

Furthermore, the machine-readable medium 1238 is non-transitory (in other words, not having any transitory signals) in that it does not embody a propagating signal. However, labeling the machine-readable medium 1238 as "non-transitory" should not be construed to mean that the medium is incapable of movement; the medium should be considered as being transportable from one physical location to another. Additionally, since the machine-readable medium 1238 is tangible, the medium may be considered to be a machine-readable device.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A method comprising:

at a server computer, receiving a request via an electronic communication network from a client device to lock data access functionality in at least three databases, the request identifying a person having data in each of the databases and each of the databases corresponding to a different entity of a plurality of entities;

receiving, by the server computer, from a server corresponding to a first entity of the plurality of entities, an authentication prompt for the person;

receiving, by the server computer, from the client device, an authentication response to the authentication prompt;

after receiving the authentication response and in response to the request, causing, by the server computer, presentation of a user interface on the client device, the user interface providing a single lock option to lock the data access functionality in the at least three databases, the user interface comprising:

a first portion that indicates which of the plurality of entities has locked data access; and a second portion that is operable to cause display of individual controls for at least three entities of the plurality of entities;

in response to receiving an indication of activation of the single lock option, transmitting via the electronic communication network a lock message to each of the at least three databases to lock the data access functionality of a corresponding entity; and communicating, via the electronic communication network, an update message to cause the user interface to confirm that the data access functionality has been locked.

2. The method of claim 1, wherein:

the method further comprises:

causing, by the server computer, prior to the presentation of the user interface comprising the single lock option, a second user interface comprising the authentication prompt to be presented on the client device;

transmitting, by the server computer, to the server corresponding to the first entity, the authentication response to the authentication prompt; and receiving, by the server computer, from the server corresponding to the first entity, an authorization to lock data access functionality for the person; and the causing of the presentation of the user interface comprising the single lock option occurs in response to the receipt of the authorization to lock data access functionality for the person.

3. The method of claim 1, wherein:

the transmitting of the request for the first entity to lock data access functionality for the person comprises using a Web Services application programming interface (API).

4. The method of claim 3, wherein:

the plurality of entities includes a second entity; and the transmitting of the request for the second entity to lock data access functionality for the person comprises using a hypertext transfer protocol (HTTP).

5. The method of claim 4, wherein the transmitting of the request for the first entity to lock data access functionality for the person comprises using a simple object access protocol (SOAP).

6. The method of claim 4, wherein the transmitting of the request for the first entity to lock data access functionality for the person comprises using a representational state transfer (REST) application programming interface (API).

7. The method of claim 1, wherein:

the update message comprises an indication that all of the entities have locked data access functionality for the person.

8. The method of claim 1, further comprising:

determining that the first entity has not locked data access functionality for the person based on a reply from the database corresponding to the first entity, the reply received in response to a second request for the first entity to report a status for the person.

9. The method of claim 1, further comprising:

in response to determining that the first entity has not locked data access functionality for the person, sending a message to an administrator.

10. The method of claim 1, further comprising:

in response to detecting a first interaction with the second portion of the user interface, causing the display of the individual controls for the at least three entities; and in response to detecting a second interaction with the individual control for a second entity of the at least three entities, transmitting via the electronic communication network a second lock message to the database corresponding to the second entity.

11. A server computer comprising:

a memory that stores instructions; and one or more processors configured by the instructions to perform operations comprising:

receiving a request via an electronic communication network from a client device to lock data access functionality in at least three databases, the request identifying a person having data in each of the databases and each of the databases corresponding to a different entity of a plurality of entities;

receiving, by the server computer, from a server corresponding to a first entity of the plurality of entities, an authentication prompt for the person;

receiving, by the server computer, from the client device, an authentication response to the authentication prompt;

after receiving the authentication response and in response to the request, causing presentation of a user interface on the client device, the user interface providing a single lock option to lock the data access functionality in the at least three databases, the user interface comprising:

a first portion that indicates which of the plurality of entities has locked data access; and a second portion that is operable to cause display of individual controls for at least three entities of the plurality of entities;

in response to receiving an indication of activation of the single lock option, transmitting via the electronic communication network a lock message to each of the at least three databases to lock the data access functionality of a corresponding entity; and communicating, via the electronic communication network, an update message to cause the user interface to confirm that the data access functionality has been locked.

12. The server computer of claim 11, wherein:

the operations further comprise:

causing, prior to the presentation of the user interface comprising the single lock option, a second user interface comprising the authentication prompt to be presented on the client device;

transmitting, to the server corresponding to the first entity, the authentication response to the authentication prompt; and receiving, from the server corresponding to the first entity, an authorization to lock data access functionality for the person; and the causing of the presentation of the user interface comprising the single lock option occurs in response to the receipt of the authorization to lock data access functionality for the person.

13. The server computer of claim 11, wherein:

the transmitting of the request for the first entity to lock data access functionality for the person comprises using a Web Services application programming interface (API).

14. The server computer of claim 13, wherein:

the plurality of entities includes a second entity; and the transmitting of the request for the second entity to lock data access functionality for the person comprises using a hypertext transfer protocol (HTTP).

15. The server computer of claim 11, wherein the operations further comprise:

in response to detecting a first interaction with the second portion of the user interface, causing the display of the individual controls for the at least three entities; and in response to detecting a second interaction with the individual control for a second entity of the at least three entities, transmitting via the electronic communication network a second lock message to the database corresponding to the second entity.

16. A non-transitory computer-readable medium that stores instructions, which, when executed by one or more processors of a server computer, cause the server computer to perform operations comprising:

receiving a request via an electronic communication network from a client device to lock data access functionality in at least three databases, the request identifying a person having data in each of the databases and each of the databases corresponding to a different entity of a plurality of entities;

receiving, by the server computer, from a server corresponding to a first entity of the plurality of entities, an authentication prompt for the person;

receiving, by the server computer, from the client device, an authentication response to the authentication prompt;

after receiving the authentication response and in response to the request, causing presentation of a user interface on the client device, the user interface providing a single lock option to lock the data access functionality in the at least three databases the user interface comprising:

a first portion that indicates which of the plurality of entities has locked data access; and a second portion that is operable to cause display of individual controls for at least three entities of the plurality of entities;

in response to receiving an indication of activation of the single lock option, transmitting via the electronic communication network a lock message to each of the at least three databases to lock the data access functionality of a corresponding entity; and communicating, via the electronic communication network, an update message to cause the user interface to confirm that the data access functionality has been locked.

17. The computer-readable medium of claim 16, wherein: the operations further comprise:

causing, by the server computer, prior to the presentation of the user interface comprising the single lock option, a second user interface comprising the authentication prompt to be presented on the client device;

transmitting, by the server computer, to the server corresponding to the first entity, the authentication response to the authentication prompt; and receiving, by the server computer, from the server corresponding to the first entity, an authorization to lock data access functionality for the person; and the causing of the presentation of the user interface comprising the single lock option occurs in response to the receipt of the authorization to lock data access functionality for the person.

18. The computer-readable medium of claim 16, wherein: the transmitting of the request for the first entity to lock data access functionality for the person comprises using a Web Services application programming interface (API).

19. The computer-readable medium of claim 18, wherein: the plurality of entities includes a second entity; and the transmitting of the request for the second entity to lock data access functionality for the person comprises using a hypertext transfer protocol (HTTP).

* * * * *

UNITED STATES PATENT AND TRADEMARK OFFICE

CERTIFICATE OF CORRECTION

PATENT NO. : 10,956,594 B2
APPLICATION NO. : 15/986284
DATED : March 23, 2021
INVENTOR(S) : VanLoo et al.

It is certified that error appears in the above-identified patent and that said Letters Patent is hereby corrected as shown below:

In the Claims

Column 21, Line 8, Claim 16, delete “databases” and insert --databases,-- therefor Signed and Sealed this
First Day of June, 2021

Drew Hirshfeld
*Performing the Functions and Duties of the*
*Under Secretary of Commerce for Intellectual Property and*
*Director of the United States Patent and Trademark Office*